United States Patent
Wu

(10) Patent No.: US 11,291,100 B2
(45) Date of Patent: Mar. 29, 2022

(54) LAMP DRIVER CIRCUIT AND LAMP DRIVING METHOD

(71) Applicant: Qisda Corporation, Taoyuan (TW)

(72) Inventor: Chih-Hsiang Wu, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/218,286

(22) Filed: Mar. 31, 2021

(65) Prior Publication Data

US 2021/0321506 A1 Oct. 14, 2021

(30) Foreign Application Priority Data

Apr. 8, 2020 (CN) .......................... 202010271005.3

(51) Int. Cl.
H05B 45/30 (2020.01)
H05B 47/20 (2020.01)
H02H 3/24 (2006.01)

(52) U.S. Cl.
CPC ............... *H05B 47/20* (2020.01); *H02H 3/24* (2013.01)

(58) Field of Classification Search
CPC ........ H05B 45/30; H05B 45/40; H05B 45/50; H05B 47/00; H05B 47/20; H05B 47/24; H02H 3/207; H02H 3/24
See application file for complete search history.

(56) References Cited

U.S. PATENT DOCUMENTS

| | | | | |
|---|---|---|---|---|
| 6,420,838 | B1* | 7/2002 | Shackle | H05B 41/2851 315/224 |
| 9,706,613 | B2* | 7/2017 | Gibbs | H05B 45/46 |
| 2004/0032224 | A1* | 2/2004 | Yeh | H05B 41/2855 315/291 |
| 2014/0292210 | A1* | 10/2014 | Clauberg | H05B 45/355 315/159 |
| 2014/0320007 | A1* | 10/2014 | Stamm | H05B 45/44 315/51 |
| 2015/0305122 | A1* | 10/2015 | Saes | H05B 45/50 315/129 |

* cited by examiner

*Primary Examiner* — Thai Pham

(57) ABSTRACT

A lamp driver circuit for driving a lamp is provided. The lamp driver circuit includes: an under voltage protection circuit; a control circuit coupled to the under voltage protection circuit; and a driver transistor coupled to the control circuit for driving the lamp under the control of the control circuit. The under voltage protection circuit detects an operation voltage. When the operation voltage is lower than a threshold, the under voltage protection circuit outputs an enable signal. The control circuit receives the enable signal to shut down the control circuit and shut down the driver transistor.

20 Claims, 4 Drawing Sheets

LAMP DRIVER CIRCUIT AND LAMP DRIVING METHOD

This application claims the benefit of People's Republic of China application Serial No. 202010271005.3, filed Apr. 8, 2020, the subject matter of which is incorporated herein by reference.

BACKGROUND OF THE INVENTION

Field of the Invention

The invention relates in general to a lamp driver circuit and a lamp driving method.

Description of the Related Art

Laser or LED projector has played an important role in projector market. Since the lamp driver circuit (such as LED driver circuit) of the Laser or LED projector is normally driven by a low voltage, the voltage of the driver transistor of the lamp driver circuit is in a lower range.

However, as the brightness of the projector gradually increases, the lamp driver circuit needs to drive a high voltage lamp. Therefore, the driver transistor of the lamp driver circuit must be formed of high-voltage resistant elements to assure the stability of the driver transistor and to avoid the elements of the driver transistor being burnt out and damaged.

Since the existing lamp driver circuit still follows low voltage design, it is likely that the low output voltage of the lamp driver circuit is unable to drive the high voltage transistor and therefore will cause the high voltage transistor to be burnt out.

SUMMARY OF THE INVENTION

According to one embodiment of the present invention, a lamp driver circuit for driving a lamp is provided. The lamp driver circuit includes an under voltage protection circuit; a control circuit coupled to the under voltage protection circuit; and a driver transistor coupled to the control circuit for driving the lamp under the control of the control circuit. The under voltage protection circuit detects an operation voltage. When the operation voltage is lower than a threshold, the under voltage protection circuit outputs an enable signal. The control circuit receives the enable signal to shut down the control circuit and shut down the driver transistor.

According to another embodiment of the present invention, a lamp driving method for driving a lamp by a lamp driver circuit is provided. The lamp driver circuit includes an under voltage protection circuit coupled to a control circuit of the under voltage protection circuit for driving the lamp under the control of a driver transistor of the control circuit. The lamp driving method includes the following steps. An operation voltage is detected by the under voltage protection circuit. When the operation voltage is lower than a threshold, an enable signal is outputted by the under voltage protection circuit. The enable signal is received by the control circuit to shut down the control circuit and shut down the driver transistor.

The above and other aspects of the invention will become better understood with regard to the following detailed description of the preferred but non-limiting embodiment(s). The following description is made with reference to the accompanying drawings.

DETAILED DESCRIPTION OF THE INVENTION

Technical terms are used in the specification with reference to generally-known terminologies used in the technology field. For any terms described or defined in the specification, the descriptions and definitions in the specification shall prevail. Each embodiment of the present disclosure has one or more technical features. Given that each embodiment is implementable, a person ordinarily skilled in the art can selectively implement or combine some or all of the technical features of any embodiment of the present disclosure.

Figure 1:
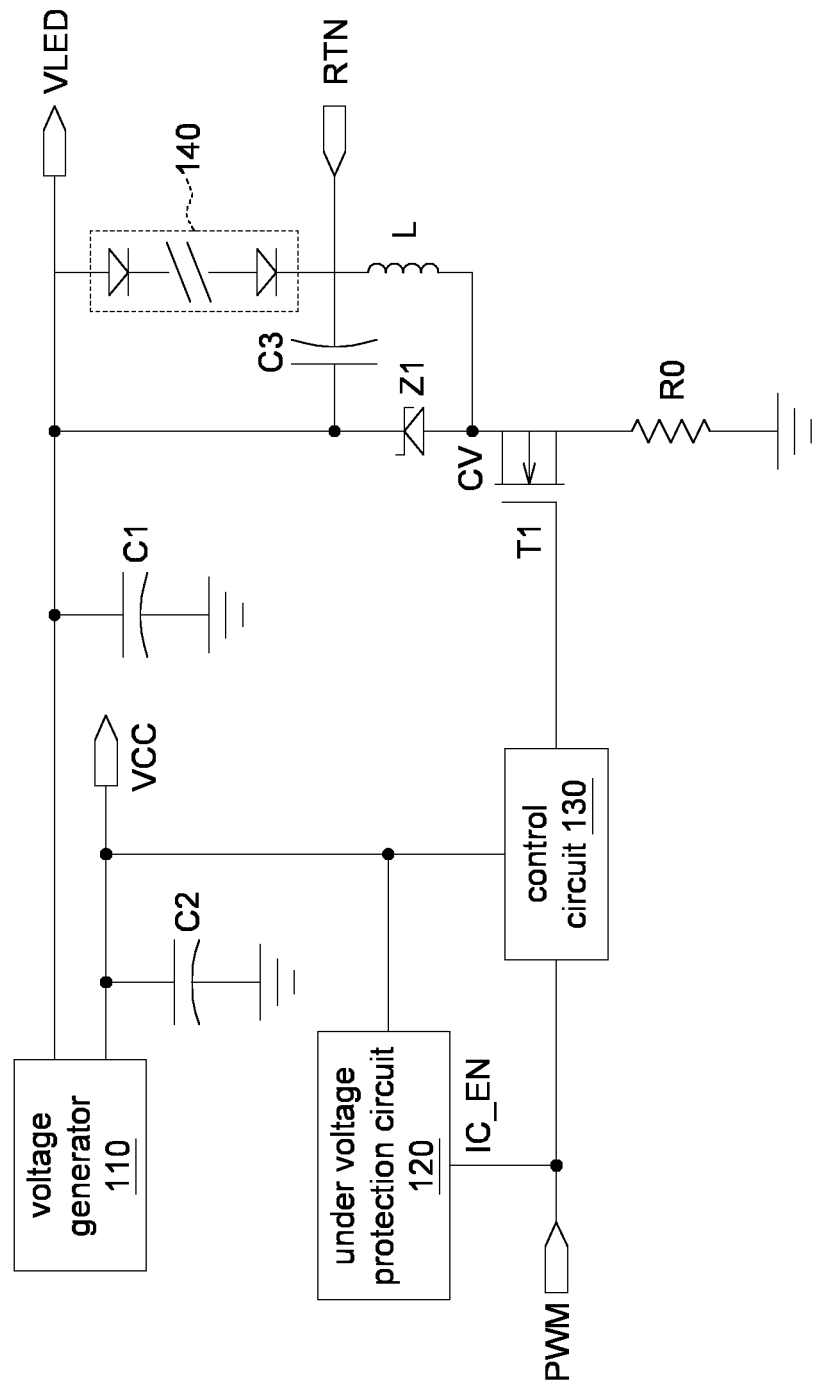
FIG. 1 is a functional block diagram of a lamp driver circuit according to an embodiment of the present disclosure.

Referring to FIG. 1, a functional block diagram of a lamp driver circuit according to an embodiment of the present disclosure is shown. As indicated in FIG. 1, the lamp driver circuit 100 of the present disclosure can drive the lamp 140 (illustratively but not restrictively, the lamp includes a number of LEDs connected in series). The lamp driver circuit 100 includes a voltage generator 110, an under voltage protection circuit 120, a control circuit 130, capacitors C1-C3, a Zener diode Z1, a driver transistor T1, an inductor L and a resistor R0.

The voltage generator 110 may be realized by an AC/DC converter configured to generate an operation voltage VCC and a lamp driving voltage VLED. The lamp driving voltage VLED is for driving the lamp 140. The operation voltage VCC is used as the operation voltage of the control circuit 130.

The under voltage protection circuit 120 is configured to detect whether the operation voltage VCC generated by the voltage generator 110 is lower than a threshold. If the operation voltage VCC is lower than the threshold, the under voltage protection circuit 120 can pull down the enable signal IC_EN to shut down the control circuit 130 and protect the driver transistor T1 from being burnt down. On the other hand, if the operation voltage VCC is higher than the threshold, the under voltage protection circuit 120 can pull up the enable signal IC_EN to make the control circuit 130 operate normally.

The control circuit 130 receives the operation voltage VCC generated by the voltage generator 110 and a pulse width modulation (PWM) signal. The control circuit 130 can drive the driver transistor T1 according to the PWM signal to make the lamp 140 illuminate. That is, the control circuit 130 receives the PWM signal to activate or shut down the driver transistor T1 and correspondingly makes the lamp 140 turned on/off. The control circuit 130 further provides a control voltage CV to the driver transistor T1, wherein the value of the control voltage CV can be positively related to the operation voltage VCC.

The lamp 140 includes at least one LED. When the driver transistor T1 is conducted, the lamp 140 illuminates. The driver transistor T1 and the lamp 140 are connected in series, and when the driver transistor T1 is shut down, the lamp 140 is open-circuited.

The capacitor C1 is configured to filter the lamp driving voltage VLED generated by the voltage generator 110.

The capacitor C2 is configured to filter the operation voltage VCC generated by the voltage generator 110.

The capacitor C3 can be used as an energy storage unit.

The Zener diode Z1 is configured to stabilize the voltage.

The driver transistor T1 is configured to provide a driving current to the lamp 140 to make the lamp 140 illuminate.

The inductor L is configured to store the energy. The resistor R0 can convert a voltage into a current. The resistor R0 is connected between the driver transistor T1 and a ground end.

Figure 2:
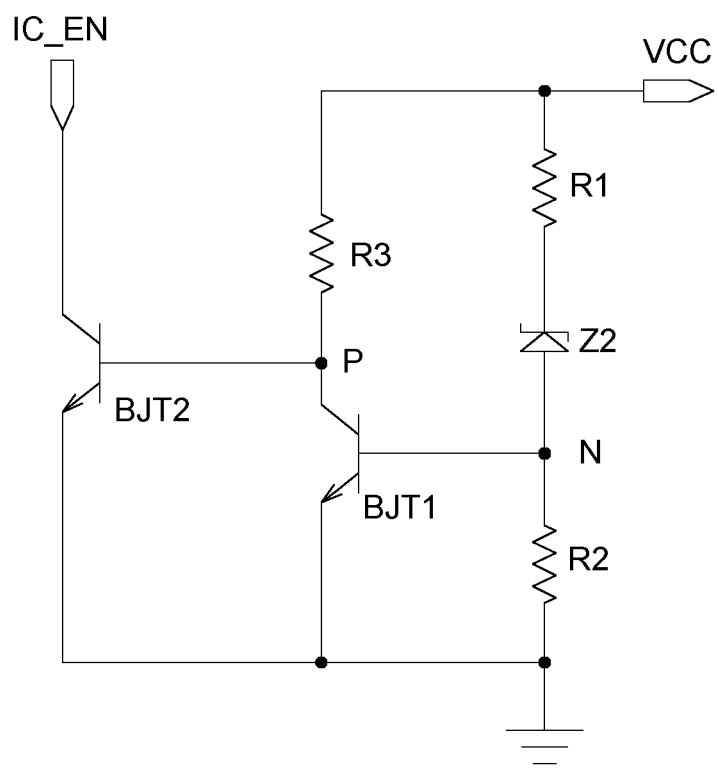
FIG. 2 to FIG. 4 respectively are circuit architecture diagrams of an under voltage protection circuit according to embodiments of the present disclosure.
Figure 3:
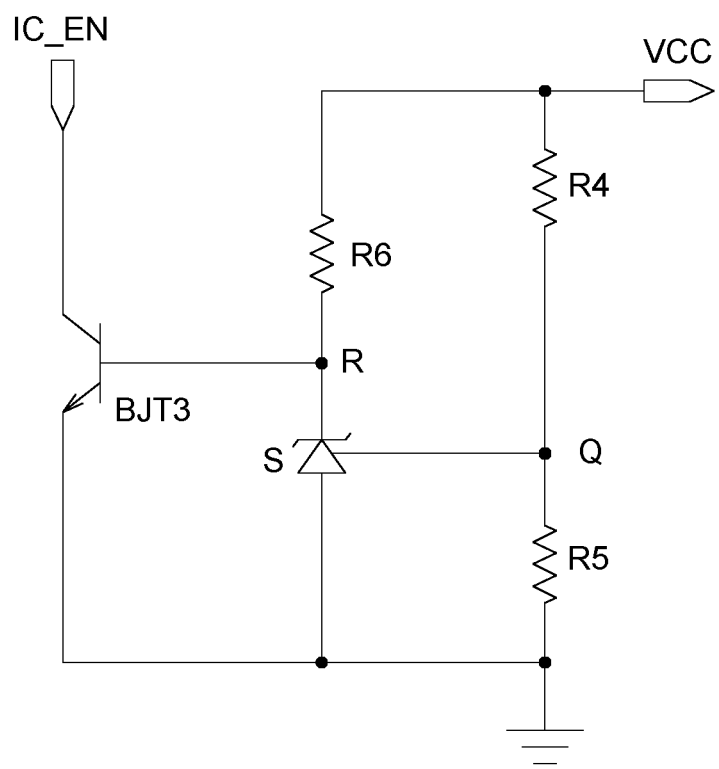
Figure 4:
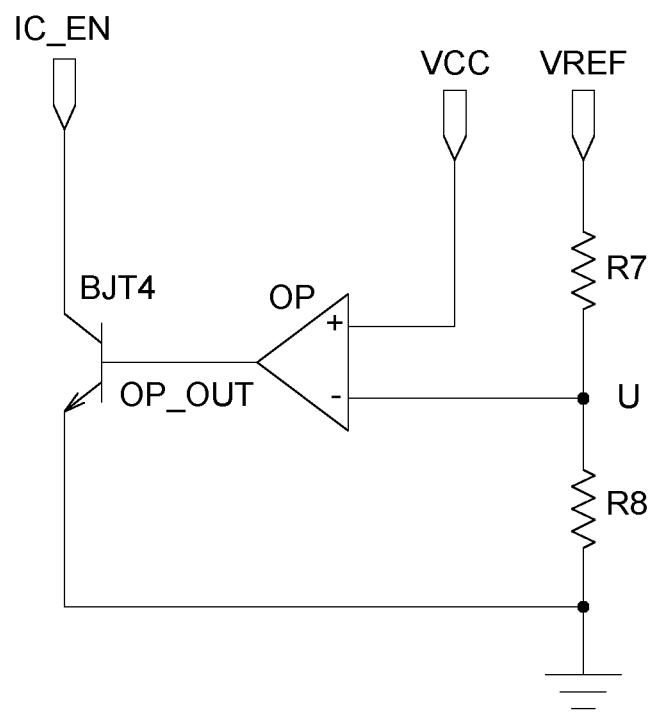

The present disclosure discloses a number of embodiments of the under voltage protection circuit 120. FIG. 2 to FIG. 4 respectively are circuit architecture diagrams of an under voltage protection circuit 120 according to a number of embodiments of the present disclosure.

As indicated in FIG. 2, the under voltage protection circuit 120A includes a Zener diode Z2, resistors R1-R3, and bipolar junction transistors (BJT) BJT1 and BJT2.

The resistors R1 and R2 can form a voltage divider circuit. One end of the Zener diode Z2 is coupled to the operation voltage VCC through the resistor R1, and the other end of the Zener diode Z2 is coupled to the ground end through the resistor R2.

The resistor R1 is coupled between one end of the Zener diode Z2 and the operation voltage VCC. The resistor R2 is coupled between the other end of the Zener diode Z2 and a ground end. The resistor R3 is coupled between the operation voltage VCC and a collector of the bipolar junction transistor BJT1.

The bipolar junction transistor BJT1 includes a base coupled to a node N (the node N is a connection point between the Zener diode Z2 and the resistor R2); a collector coupled to the resistor R3; and an emitter coupled to the ground end.

The bipolar junction transistor BJT2 includes a base coupled to the node P (the node P is a connection point between a collector of the bipolar junction transistor BJT1 and the resistor R3); a collector coupled to the enable signal IC_EN; and an emitter coupled to the ground end.

Detailed operations of the under voltage protection circuit 120A are disclosed below. In the descriptions below, the normal value of the operation voltage VCC is exemplified by 12V, the turn-on voltage of the Zener diode Z2 is exemplified by 10V, the threshold voltage of the bipolar junction transistors BJT1 and BJT2 is exemplified by 0.6V, and the resistors R1 and R2 have an identical resistance (1 K ohm), but the present disclosure is not limited to the above exemplifications.

When the operation voltage VCC is 12V, the Zener diode Z2 can be conducted, and the resistors R1 and R2 can divide the operation voltage VCC (12V−10V=2V), such that the voltage of the node N is 1V and is greater than the threshold voltage of the bipolar junction transistor BJT1, and the bipolar junction transistor BJT1 can be conducted. Since the bipolar junction transistor BJT1 is conducted, the node P is pulled down (the voltage of the node P is 0V), the bipolar junction transistor BJT2 is not conducted, and the enable signal IC_EN is the pre-determined value (logic high). In response to the enable signal IC_EN being the pre-determined value (logic high), the control circuit 130 can operate normally.

Conversely, when the operation voltage VCC drops to such as 10.6V due to some reasons, the Zener diode Z2 still can be conducted, and the resistors R1 and R2 still can divide the operation voltage VCC (10.6V−10V=0.6V), such that the voltage of the node N is 0.3V and is smaller than the threshold voltage of the bipolar junction transistor BJT1, and the bipolar junction transistor BJT1 is not conducted. Since the bipolar junction transistor BJT1 is not conducted, the node P is pulled up (the voltage of the node P=VCC), the bipolar junction transistor BJT2 is conducted (the voltage of the node P is higher than the threshold voltage of the bipolar junction transistor BJT2), and the enable signal IC_EN is pulled down. In response to the enable signal IC_EN being pulled down, the control circuit 130 is shut down. Thus, the driver transistor T1 will not be driven and therefore will not be burnt down.

As indicated in FIG. 3, the under voltage protection circuit 120B includes a silicon controlled rectifier (SCR) S, resistors R4-R6 and a bipolar junction transistor BJT3.

The silicon controlled rectifier S includes a gate coupled to the node Q (the node Q is a connection point between the resistor R4 and the resistor R5); an anode coupled to the node R (the node R is a connection point between the resistor R6 and the bipolar junction transistor BJT3) and a cathode coupled to the ground end.

The resistor R4 is coupled between one end of the resistor R5 and the operation voltage VCC. The resistor R5 is coupled between the node Q and a ground end. The resistor R4 and R5 from a voltage divider circuit. The resistor R6 is coupled between the operation voltage VCC and the anode of the silicon controlled rectifier S.

The bipolar junction transistor BJT3 includes a base coupled to the node R; a collector coupled to the enable signal IC_EN; and an emitter coupled to the ground end.

Detailed operations of the under voltage protection circuit 120B are disclosed below. In the descriptions below, the normal value of the operation voltage VCC is exemplified by 12V, the threshold voltage of the silicon controlled rectifier S is exemplified by 2.5V, the threshold voltage of the bipolar junction transistor BJT3 is exemplified by 0.6V, the resistances of the resistors R4 and R5 are 3 K ohm and 1 K ohm, but the present disclosure is not limited to the above exemplifications.

When the operation voltage VCC is 12V, the resistors R4 and R5 can divide the operation voltage VCC, such that the voltage of the node Q is about 3V and is higher than the threshold voltage of the silicon controlled rectifier S, and the silicon controlled rectifier S can be conducted. Since the silicon controlled rectifier S is conducted, the node R is pulled down (the voltage of the node Q is 0V), the bipolar junction transistor BJT3 is not conducted, and the enable signal IC_EN is the pre-determined value (logic high). In response to the enable signal IC_EN being the pre-determined value (logic high), the control circuit 130 can operate normally.

Conversely, when the operation voltage VCC drops to such as 8V due to some reasons, the resistor R4 and R5 can divide the operation voltage VCC, such that voltage of the node Q is about 2V and is lower than the threshold voltage of the silicon controlled rectifier S, and the silicon controlled rectifier S is not conducted. Since the silicon controlled rectifier S is not conducted, the node R is pulled up (the voltage of the node R=VCC), the bipolar junction transistor BJT3 is conducted, and the enable signal IC_EN is pulled down. In response to the enable signal IC_EN being pulled down, the control circuit 130 is shut down. Thus, the driver transistor T1 will not be driven and therefore will not be burnt down.

As indicated in FIG. 4, the under voltage protection circuit 120C includes a comparator OP, resistors R7-R8 and a bipolar junction transistor BJT4.

The comparator OP includes a positive input end configured to receive an operation voltage VCC; a negative input end coupled to the node U configured to receive a division voltage of the reference voltage VREF; and an output end configured to output a comparator output signal OP_OUT to the base of the bipolar junction transistor BJT4.

The resistor R7 is coupled between one end of the resistor R8 and the reference voltage VREF. The resistor R8 is coupled between the node U and a ground end. The resistors R7 and R8 form the voltage divider circuit.

The bipolar junction transistor BJT4 includes a base coupled to the output end of the comparator OP; a collector coupled to the enable signal IC_EN; and an emitter coupled to the ground end.

Detailed operations of the under voltage protection circuit 120C are disclosed below. In the descriptions below, the normal value of the operation voltage VCC is exemplified by 12V, the threshold voltage of the bipolar junction transistor BJT4 is exemplified by 0.6V, the voltage of the node U is exemplified by 10V, but the present disclosure is not limited to the above exemplifications. For the voltage of the node U to be 10V, illustratively but not restrictively, the reference voltage VREF is 20V, and the resistance of the resistor R7 and R8 is about 1 K ohm.

When the operation voltage VCC is 12V, the comparator OP compares the operation voltage VCC with the voltage of the node U (10V), and outputs a logic low comparator output signal OP_OUT, such that the bipolar junction transistor BJT4 is not conducted, and the enable signal IC_EN is the pre-determined value (logic high). In response to the enable signal IC_EN being the pre-determined value (logic high), the control circuit 130 can operate normally.

Conversely, when the operation voltage VCC drops to such as 8V due to some reasons, the comparator OP compares the operation voltage VCC with the voltage of the node U (10V), and outputs a logic high comparator output signal OP_OUT, such that the bipolar junction transistor BJT4 is conducted, and the enable signal IC_EN is pulled down. In response to the enable signal IC_EN being pulled down, the control circuit 130 is shut down. Thus, the driver transistor T1 will not be driven and therefore will not be burnt down.

As disclosed on above embodiments of the present disclosure, the under voltage protection circuit can detect the operation voltage VCC, and even when the operation voltage VCC abnormally drops due to some reasons, the under voltage protection circuit can immediately shut down the driver transistor and stop the operation of the driver transistor to avoid the driver transistor being burning down.

While the invention has been described by way of example and in terms of the preferred embodiment(s), it is to be understood that the invention is not limited thereto. On the contrary, it is intended to cover various modifications and similar arrangements and procedures and the scope of the appended claims therefore should be accorded the broadest interpretation so as to encompass all such modifications and similar arrangements and procedures.

What is claimed is:

1. A lamp driver circuit for driving a lamp, wherein the lamp driver circuit comprises:
   an under voltage protection circuit;
   a control circuit coupled to the under voltage protection circuit; and
   a driver transistor coupled to the control circuit for driving the lamp under the control of the control circuit,
   wherein, the under voltage protection circuit detects an operation voltage, and when the operation voltage is lower than a threshold, the under voltage protection circuit outputs an enable signal, and the control circuit receives the enable signal to shut down the control circuit and shut down the driver transistor.

2. The lamp driver circuit according to claim 1, wherein, when the under voltage protection circuit detects that the operation voltage is higher than the threshold, the under voltage protection circuit pulls up the enable signal, and the control circuit operates normally to drive the driver transistor.

3. The lamp driver circuit according to claim 1, wherein, the under voltage protection circuit comprises:
   a Zener diode,
   a voltage divider circuit coupled to the Zener diode;
   a first bipolar junction transistor (BJT) coupled to the Zener diode;
   a second bipolar junction transistor coupled to the first bipolar junction transistor;
   wherein, the Zener diode and the voltage divider circuit are coupled to the operation voltage;
   when the operation voltage is higher than the threshold, the Zener diode is conducted, a division voltage of the voltage divider circuit conducts the first bipolar junction transistor conducted and disconnects the second bipolar junction transistor, the enable signal is logic high, and the control circuit operates normally in response to the logic high enable signal.

4. The lamp driver circuit according to claim 3, wherein, when the operation voltage is lower than the threshold, the division voltage of the voltage divider circuit disconnects the first bipolar junction transistor not conducted and conducts the second bipolar junction transistor, the enable signal is pulled down to logic low, and the control circuit is shut down to shut down the driver transistor in response to the logic low enable signal.

5. The lamp driver circuit according to claim 1, wherein, the under voltage protection circuit comprises:
   a silicon controlled rectifier,
   a voltage divider circuit coupled to the silicon controlled rectifier and the operation voltage; and
   a third bipolar junction transistor coupled to the silicon controlled rectifier,
   wherein, when the operation voltage is higher than the threshold, a division voltage of the voltage divider circuit conducts the silicon controlled rectifier conducted and disconnects the third bipolar junction transistor, the enable signal is logic high, and the control circuit operates normally in response to the logic high enable signal.

6. The lamp driver circuit according to claim 5, wherein, when the operation voltage is lower than the threshold, the division voltage of the voltage divider circuit disconnects the silicon controlled rectifier not conducted and conducts the third bipolar junction transistor, the enable signal is logic low, and the control circuit is shut down to shut down the driver transistor.

7. The lamp driver circuit according to claim 1, wherein, the under voltage protection circuit comprises:
   a comparator coupled to the operation voltage;
   a voltage divider circuit coupled to the comparator and a reference voltage; and
   a fourth bipolar junction transistor coupled to the comparator,
   wherein, when the operation voltage is higher than the threshold, the comparator compares the operation voltage with a division voltage of the voltage divider circuit and outputs a comparator output signal to disconnect the fourth bipolar junction transistor, the enable signal is logic high, and the control circuit operates normally.

8. The lamp driver circuit according to claim 7, wherein, when the operation voltage is lower than the threshold, the comparator compares the operation voltage with the division voltage of the voltage divider circuit and outputs the comparator output signal to conduct the fourth bipolar junction transistor, the enable signal is logic low, and the control circuit is shut down to shut down the driver transistor.

9. The lamp driver circuit according to claim 1, wherein the control circuit receives a PWM signal to activate or shut down the driver transistor and correspondingly turn the lamp turned on/off.

10. The lamp driver circuit according to claim 1, wherein:
the operation voltage drives the control circuit and the control circuit provides a control voltage to the driver transistor, wherein the control voltage is positively related to the operation voltage; and
the driver transistor and the lamp are connected in series, and when the driver transistor is shut down, the lamp is open-circuited.

11. A lamp driving method for driving a lamp using a lamp driver circuit, the lamp driver circuit comprising an under voltage protection circuit coupled to a control circuit of the under voltage protection circuit for driving the lamp under control of a driver transistor of the control circuit, the lamp driving method comprising:
detecting an operation voltage by the under voltage protection circuit;
when the operation voltage is lower than a threshold, outputting an enable signal by the under voltage protection circuit; and
receiving the enable signal by the control circuit to shut down the control circuit and shut down the driver transistor.

12. The lamp driving method according to claim 11, wherein, when the under voltage protection circuit detects that the operation voltage is higher than the threshold, the under voltage protection circuit pulls up the enable signal, the control circuit operates normally to drive the driver transistor.

13. The lamp driving method according to claim 11, wherein, the under voltage protection circuit comprises:
a Zener diode,
a voltage divider circuit coupled to the Zener diode;
a first bipolar junction transistor coupled to the Zener diode;
a second bipolar junction transistor coupled to the first bipolar junction transistor;
wherein, the Zener diode and the voltage divider circuit are coupled to the operation voltage;
when the operation voltage is higher than the threshold, the Zener diode is conducted, a division voltage of the voltage divider circuit conducts the first bipolar junction transistor and disconnects the second bipolar junction transistor, the enable signal is logic high, and the control circuit operates normally in response to the logic high enable signal.

14. The lamp driving method according to claim 13, wherein, when the operation voltage is lower than the threshold, the division voltage of the voltage divider circuit disconnects the first bipolar junction transistor and conducts the second bipolar junction transistor, the enable signal is pulled down to logic low, and the control circuit is shut down to shut down the driver transistor in response to the logic low enable signal.

15. The lamp driving method according to claim 11, wherein, the under voltage protection circuit comprises:
a silicon controlled rectifier,
a voltage divider circuit coupled to the silicon controlled rectifier and the operation voltage; and
a third bipolar junction transistor coupled to the silicon controlled rectifier,
wherein, when the operation voltage is higher than the threshold, a division voltage of the voltage divider circuit conducts the silicon controlled rectifier conducted and disconnects the third bipolar junction transistor, the enable signal is logic high, and the control circuit operates normally in response to the logic high enable signal.

16. The lamp driving method according to claim 15, wherein, when the operation voltage is lower than the threshold, the division voltage of the voltage divider circuit disconnects the silicon controlled rectifier and conducts the third bipolar junction transistor, the enable signal is logic low, the control circuit is shut down to shut down the driver transistor.

17. The lamp driving method according to claim 11, wherein, the under voltage protection circuit comprises:
a comparator coupled to the operation voltage;
a voltage divider circuit coupled to the comparator and a reference voltage; and
a fourth bipolar junction transistor coupled to the comparator,
wherein, when the operation voltage is higher than the threshold, the comparator compares the operation voltage with a division voltage of the voltage divider circuit and outputs a comparator output signal to disconnect the fourth bipolar junction transistor, the enable signal is logic high, and the control circuit operates normally.

18. The lamp driving method according to claim 17, wherein, when the operation voltage is lower than the threshold, the comparator compares the operation voltage with the division voltage of the voltage divider circuit and outputs the comparator output signal to conduct the fourth bipolar junction transistor, the enable signal is logic low, and the control circuit is shut down to shut down the driver transistor.

19. The lamp driving method according to claim 11, wherein the control circuit receives a PWM signal to activate or shut down the driver transistor and correspondingly turn the lamp turned on/off.

20. The lamp driving method according to claim 11, wherein
the operation voltage drives the control circuit and the control circuit provides a control voltage to the driver transistor, wherein the control voltage is positively related to the operation voltage; and
the driver transistor and the lamp are connected in series, and when the driver transistor is shut down, the lamp is open-circuited.

* * * * *